(12) United States Patent
Bao et al.

(10) Patent No.: US 11,900,255 B2
(45) Date of Patent: Feb. 13, 2024

(54) MULTI-MODE SMELTING METHOD BASED ON THE CLASSIFICATION SYSTEM OF MOLTEN IRON

(71) Applicant: UNIVERSITY OF SCIENCE AND TECHNOLOGY BEIJING, Beijing (CN)

(72) Inventors: Yanping Bao, Beijing (CN); Ruixuan Zheng, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 18/183,402

(22) Filed: Mar. 14, 2023

(65) Prior Publication Data

US 2023/0368021 A1    Nov. 16, 2023

(30) Foreign Application Priority Data

May 11, 2022    (CN) .......................... 202210507582.7

(51) Int. Cl.
  *G06N 3/08*    (2023.01)
(52) U.S. Cl.
  CPC ..................... *G06N 3/08* (2013.01)
(58) Field of Classification Search
  CPC .......................................................... G06N 3/08
  See application file for complete search history.

(56) References Cited

U.S. PATENT DOCUMENTS 5,327,357 A * 7/1994 Feinstein .............. C21C 7/0685
                                                     75/375

FOREIGN PATENT DOCUMENTS

| CN | 109234491 A | 1/2019 |
| CN | 109252009 A | 1/2019 |
| CN | 110438284 A | 11/2019 |
| CN | 111353656 A | 6/2020 |
| CN | 112036081 A | 12/2020 |
| CN | 2021189739 A1 | 9/2021 |

(Continued)

OTHER PUBLICATIONS

Lia C, Zhaoa Y, Lia S. Prediction of the Yield Based on the BP Neural Network and Fitting. (Year: 2021).*

(Continued)

*Primary Examiner* — Fayyaz Alam

(57) ABSTRACT

The invention is in the field of iron and steel metallurgy, specifically a method and system for determining the amount of alloy added during the converter tapping process. Given that the LSTM neural network has a strong ability to capture nonlinear relationships, the invention builds an alloy element yield prediction model based on the LSTM neural network. Because different alloy elements have different factors that affect their yield, that is, different model input variables, different LSTM models are established for training. Furthermore, the invention uses integer linear programming to combine the yield prediction results to determine the alloy addition amount. This method not only finds the optimal alloy proportioning scheme quickly, but it also improves the component hit rate and the stability of steel products in the converter steelmaking process, obtains the lowest total cost, effectively reduces alloying costs, and has a good application prospect.

9 Claims, 3 Drawing Sheets

(56) References Cited

FOREIGN PATENT DOCUMENTS

CN 114196795 A 3/2022

OTHER PUBLICATIONS

Shi CY, Wang BS, Zhong RX, Yin XX, Guo SY. Prediction of Alloy Addition by Various Factors In Refining Process. In2021 International Conference on Mechanical, Aerospace and Automotive Engineering Dec. 3, 2021 (pp. 212-216). (Year: 2021).*

Fu X, Liu H, Chai L. Design of LF Furnace Alloy Charging Optimization Model Based on Improved PSO-RBF Network. In2021 IEEE 3rd International Conference on Frontiers Technology of Information and Computer (ICFTIC) Nov. 12, 2021 (pp. 128-132). IEEE. (Year: 2021).*

Zhao Z, Li S, Li S. Optimal batching plan of deoxidation alloying based on principal component analysis and linear programming. Journal of Mechanical Engineering Research. Jun. 24, 2020;3(2). (Year: 2020).*

Ma T, Wang T, Huang J, Wang L, Liu X, Liu Y, Dong H, Yan D. Optimization of "Deoxidation Alloying" Batching Scheme. (Year: 2020).*

* cited by examiner

MULTI-MODE SMELTING METHOD BASED ON THE CLASSIFICATION SYSTEM OF MOLTEN IRON

FIELD OF THE DISCLOSURE

The invention relates to the technical field of iron and steel metallurgy, in particular to a method and system for determining the amount of alloy added during converter tapping.

BACKGROUND OF THE DISCLOSURE

Because of its high strength, good toughness and plasticity, alloy steel is widely used in the manufacturing of various shaft parts and vehicle manufacturing industry, and is very suitable for manufacturing shaft and gear parts that bear high speed, heavy load, impact and friction. The demand for alloy steel alloy materials is large and there are many kinds. The traditional method for determining the alloy addition in the process of converter steelmaking and tapping mainly depends on manual experience. Most operators choose the added alloy types according to the process requirements of smelting steel, and then use a calculator or calculation table to roughly calculate the alloy weight according to the composition requirements. This method has low accuracy and poor economic benefits, It often occurs that the alloy is repeatedly added or wasted due to inaccurate estimation of addition amount, and even the composition exceeds the standard in serious cases.

With the rapid development of science and technology, the field of iron and steel metallurgy has entered the era of intelligent manufacturing. The converter steelmaking control technology has gradually developed from empirical formula and static control to big data intelligent control. Accurate prediction of alloy element yield and determination of alloy proportioning plan are the key to accurate estimation of alloy addition in converter tapping process.

At present, the main methods to predict the yield of alloy elements are BP neural network and SVM support vector machine. Among them, the Back Propagation Neural Network (BP) realizes prediction through signal forward propagation and error back propagation, but the convergence speed is slow, the generalization ability is poor, and it is difficult to guarantee the prediction accuracy; Support Vector Machine (SVM) is a kind of generalized linear classifier that classifies data in a binary way according to supervised learning. It is not only simple in algorithm, but also has good "robustness". However, large-scale training samples are difficult to implement, and it is difficult to solve the multi-classification problem, and it is difficult to fully consider the characteristics of converter steelmaking process.

SUMMARY OF THE DISCLOSURE

The main purpose of the invention is to propose a method and system for determining the amount of alloy added in the converter tapping process, which aims to solve the problems of low accuracy and poor economic benefits, difficult to solve the multi-classification problem and difficult to fully consider the converter steelmaking process.

To solve the above technical problems, according to one aspect of the invention, the invention provides the following technical solutions:

A method for determining the amount of alloy added during converter tapping process includes the following steps:

S1. Collect the converter production data set and establish the prediction model database.

S2. Conduct data screening and elutriation on the collected converter production data set and pre-process the data after screening and elutriation.

S3. Determine the process parameter variables that affect the Si yield in the converter tapping process as the input variables of the model and establish the LSTM neural network Si yield prediction model.

S4. Determine the process parameter variables that affect the Mn yield in the converter tapping process as the input variables of the model and establish the LSTM neural network Mn yield prediction model.

S5. Determine the process parameter variables that affect the Cr yield in the converter tapping process as the input variables of the model, and establish the LSTM neural network Cr yield prediction model.

S6. Prediction model training and testing.

S7. Collect real-time data of on-site smelting process to predict the recovery rate of Si, Mn and Cr elements.

S8. Solve the alloy addition amount through integer linear programming.

S9. Add alloy according to the calculated alloy addition result. After tapping, the data is stored in the prediction model database.

As a preferred solution of the method for determining the amount of alloy added in the converter tapping process described in the invention, the converter production data set in step 51 includes:

Production date, furnace number, blowing cycle, molten iron composition, molten iron charge, scrap charge, slag charge, alloy charge, sublance information, endpoint chemical composition, oxygen blowing information, tapping temperature, tapping quantity and composition of ladle sample after alloying.

The method for determining the amount of alloy added in the converter tapping process according to claim 1, which is characterized in that in step S2, the collected converter production data set is screened and washed, specifically including:

Delete duplicate data, delete outliers and extreme outliers. The evaluation of outliers is as follows (1):

$$\begin{cases} x_i > U + 1.5IQR \mid x_i < L + 1.5IQR & \text{Outlier} \\ IQR = U - L \\ x_i > U + 3IQR \mid x_i < L + 3IQR & \text{Extreme Outlier} \end{cases} \quad (1)$$

Where, $x_i$ represents the i-th data after the data to be measured is sorted from small to large, U represents the upper quartile, represents the lower quartile, and IQR represents the interquartile range.

As the preferred scheme of the method for determining the amount of alloy added in the converter tapping process described in the present invention, the data after screening and elutriation are pretreated, specifically including:

Normalize the dataset to [−1,1], and the specific processing method is shown in formula (2):

$$x'_{ij} = \frac{x_{ij} - \text{mean}(x_{ij})}{\max(x_{ij}) - \min(x_{ij})} \quad (2)$$

Where, $x_{ij}$ is the original data of the production data sample; $x'_{ij}$ is the normalized data; i represents the i-th sample point; j represents the j-th input variable; $\min(x_{ij})$, max($x_{ij}$) and mean($x_{ij}$) are the minimum, maximum and average values in the original data samples.

As a preferred solution of the method for determining the amount of alloy added in the converter tapping process described in the present invention, in the steps S3, S4 and S5, the LSTM neural network comprises two neural network layers, a dropout layer, a full connection layer and a regression layer. The regression layer is the output layer, and the neural network parameters include: Training epochs, Hidden layer size and Learning rate.

As the preferred scheme of the method for determining the amount of alloy added in the converter tapping process described in the invention, Pearson correlation analysis is used to determine the process parameter variables that affect the alloy element yield in the converter tapping process in the steps S3, S4 and S5.

As a preferred solution of the method for determining the alloy addition amount in the converter tapping process described in the invention, in the step S3, the input variables of the prediction model of the Si recovery rate include: ladle state, blowing loss, alkalinity, total oxygen content, end point C, end point Mn, and tapping temperature.

As the preferred scheme of the method for determining the amount of alloy added in the converter tapping process described in the present invention, in the said step S4, the input variables of the prediction model of the Mn recovery rate include: blow loss, alkalinity, scrap ratio, total oxygen content, and end point Mn.

As the preferred scheme of a method for determining the amount of alloy added in the converter tapping process described in the present invention, in step S5, the input variables of the Cr recovery model include: blow loss, scrap ratio, end point Mn, and end point P.

As the preferred scheme of a method for determining the amount of alloy added in the converter tapping process described in the present invention, in the said step S6, the model training uses the Warm Restarts random gradient descent method to dynamically adjust the learning rate:

The meaning of restart is to use the cosine function as the periodic function and restart the learning rate at the maximum value of each cycle. The meaning of warm-up is that the learning rate does not start from scratch but is determined by the parameters of the model convergence in the last step. The learning rate adjustment is shown in equation (3):

$$\eta_t = \eta_{min}^i + \frac{1}{2}(\eta_{max}^i - \eta_{min}^i)\left(1 + \cos\left(\frac{T_{cur}}{T_i}\pi\right)\right) \quad (3)$$

Where, $\eta_{min}^i$ and $\eta_{max}^i$ are the range of learning rate; $T_{cur}$ represents the number of epoch changes from the beginning to the end of each restart; $T_i$ represents the restart cycle.

As a preferred solution of the method for determining the amount of alloy added in the converter tapping process described in the present invention, in step S6, the forgetting gate, the input gate and the output gate use the sigmoid function as the activation function in the LSTM neural network; When generating candidate memory, the hyperbolic tangent function tanh is used as the activation function.

As the preferred scheme of a method for determining the amount of alloy added in the converter tapping process described in the present invention, in step S7, the real-time data of the on-site smelting process is collected to predict the recovery rate of Si, Mn and Cr elements, specifically including:

Collect the real-time data of the on-site smelting process. The data is captured from the Oracle database of the inspection and test system through ODBC connection. After the data is preprocessed, it is input into the LSTM neural network model to obtain the predicted value of the yield.

As a preferred solution of the method for determining the alloy addition amount in the converter tapping process described in the invention, in step S8, the alloy addition amount is calculated by integer linear programming, specifically including:

The objective function is to minimize the total cost of alloy addition:

$$\min Z = \sum_{i=1}^{n} x_i \cdot r_i = x_1 \cdot r_1 + x_2 \cdot r_2 + \ldots + x_n \cdot r_n \quad (4)$$

Where: $r_i$ represents the unit price of the i-th alloy material; $x_i$ is the amount of the i-th alloy added.

At the same time, the following constraints must be met:

$$s.t. \begin{cases} \min(g_1) \leq \dfrac{\sum_{j=1}^{n} x_j c_{1j} \eta_i}{P} + b_1 \leq \max(g_1) \\ \quad \vdots \\ \min(g_i) \leq \dfrac{\sum_{j=1}^{n} x_j c_{ij} \eta_i}{P} + b_i \leq \max(g_i) \\ \quad \vdots \\ \min(g_m) \leq \dfrac{\sum_{j=1}^{n} x_j c_{mj} \eta_i}{P} + b_m \leq \max(g_m) \end{cases} \quad (5)$$

Where: P is the total weight of molten steel; $x_i$ is the addition amount of j-th alloy; $g_i$ is the content of element i; min represents the lower limit value; max represents the upper limit value; $b_i$ represents the content of elements i before alloying; $c_{ij}$ refers to the content of element i in alloy J; $\eta_i$ is the yield of element i.

The alloy addition must meet the following non-negative conditions:

$$\vec{X} = (X_1, X_2, \ldots, X_j, \ldots, X_n)^T, x_j \geq 0 \quad (6)$$

The maximum value of alloy addition less than the amount of alloy that can be added is:

$$x_j \leq L_j \quad (7)$$

Where: $L_j$ represents the maximum amount of alloy j added in actual production.

As the preferred scheme of the method for determining the alloy addition amount in the converter tapping process described in the present invention, the element recovery rate is calculated by 100%, except for Si, Mn and Cr elements predicted according to step S7.

Another object of the invention is to provide a system for determining the alloy addition amount in the converter tapping process, which implements the method for determining the alloy addition amount in the converter tapping process.

Another object of the invention is to provide an information data processing terminal for realizing the determination method of the alloy addition amount in the converter tapping process.

Another object of the invention is to provide a computer-readable storage medium, including instructions, which, when running on the computer, causes the computer to execute the determination method of the alloy addition amount in the converter tapping process.

The beneficial effects of the invention are as follows:

The invention combines LSTM neural network with integer linear programming algorithm to overcome the limitations of the conventional neural network model to predict the time series, overcome the problems of low accuracy of artificial estimation and poor economic benefits of the alloy proportioning scheme. Considering that LSTM neural network has a strong ability to capture nonlinear relationships, the invention constructs a prediction model of alloy element yield based on LSTM neural network. Different alloy elements have different factors that affect their yield, that is, different input variables of the model, so different alloy elements establish different LSTM models for training. In addition, the invention combines the yield prediction results to obtain the alloy addition amount through integer linear programming. This method can not only quickly find the optimal scheme of alloy proportioning, but also improve the component hit rate and the stability of steel products in the converter steelmaking process, and obtain the lowest total cost, effectively reduce the alloying cost, and has a good application prospect.

BRIEF DESCRIPTION OF DRAWINGS

In order to more clearly explain the embodiments of the invention or the technical solutions in the prior art, the following will briefly introduce the drawings needed in the embodiments or the description of the prior art. It is obvious that the drawings in the following description are only some embodiments of the invention. For those skilled in the art, other drawings can also be obtained according to the structure shown in these drawings without any creative work.

Figure 1:
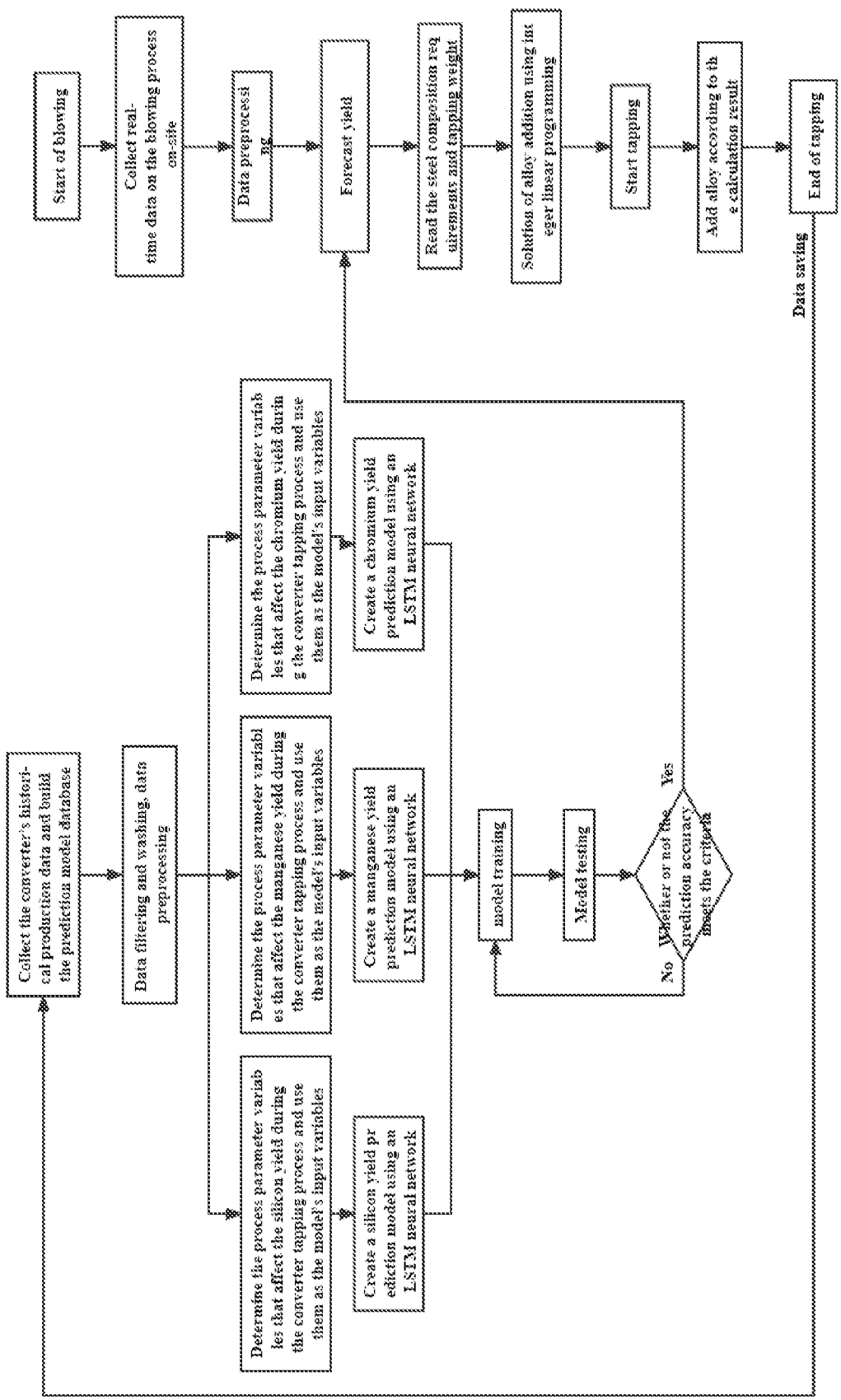
FIG. 1 is a flowchart of the method of the invention.

The realization, functional features and advantages of the present invention will be further described with reference to the attached drawings in combination with the embodiments.

DETAILED DESCRIPTION OF THE DISCLOSURE

The following will give a clear and complete description of the technical solution in the embodiments of the invention in combination with the drawings in the embodiments of the invention. Obviously, the described embodiments are only part of the embodiments of the invention, not all of them. Based on the embodiments in the invention, all other embodiments obtained by ordinary technicians in the art without creative work fall within the scope of protection of the invention.

The invention provides a method and system for determining the amount of alloy added in the converter tapping process, which combines LSTM neural network with integer linear programming algorithm to overcome the limitations of the conventional neural network model to predict the time series, and overcome the problems of low accuracy of artificial estimation and poor economic benefits of the alloy dosing scheme. Considering that LSTM neural network has a strong ability to capture nonlinear relationships, the invention constructs a prediction model of alloy element yield based on LS TM neural network. Different alloy elements have different factors that affect their yield, that is, different input variables of the model, so different alloy elements establish different LSTM models for training. In addition, the invention combines the yield prediction results to obtain the alloy addition amount through integer linear programming. This method can not only quickly find the optimal scheme of alloy proportioning, but also improve the component hit rate and the stability of steel products in the converter steelmaking process, and obtain the lowest total cost, effectively reduce the alloying cost, and has a good application prospect.

LSTM neural network is a variant of Recurrent Neural Network (RNN), which is one of the important network frameworks for deep learning. It is a kind of recursive neural network that takes sequence data as input, recurses in the forward direction of the sequence, and all nodes are connected in a chain. Different from BP neural network model, LSTM neural network can consider the dependence of data before and after the time series in the time series problem, and has better prediction effect for the problem of data correlation at different time series nodes such as converter steelmaking process; Linear programming is one of the important fields in optimization problems. Many practical problems in operational research can be solved by linear programming. Integer linear programming refers to the integer linear programming in which all decision variables must be taken as integer values. This paper involves a method for determining the amount of alloy added in the process of converter tapping of alloy steel. Due to the accuracy of the alloy material weighing system, the decision variable, namely the amount of alloy added, needs to be an integer, so the integer linear programming can solve such problems very well.

Example 1

In the tapping process of 40Cr series steel produced by a steelmaking plant, silicon manganese, ferromanganese alloy and ferrochrome alloy need to be added to meet the demand of element content of finished steel. The composition of 40Cr national standard is shown in Table 1. In actual production, the amount of alloy added is estimated by the operator based on experience. The selection of alloy type is not fixed. Some heats use silicon manganese, high carbon ferromanganese and high carbon ferrochrome; Some furnaces use silicon manganese, medium carbon ferromanganese and high carbon ferrochrome. Moreover, the low accuracy of manual estimation of alloy addition often leads to large fluctuations in the composition of molten steel from converter tapping, which not only causes waste of raw material costs, but also affects the production rhythm. In order to solve this problem, the method of the invention is used to establish a prediction model for the yield of alloy elements, and then calculate the alloy addition amount through integer programming.

TABLE 1

Standard chemical composition content of 40Cr

| Steel grade | C | Si | Mn | Cr | Ni | P | S | Cu |
|---|---|---|---|---|---|---|---|---|
| 40Cr | 0.37~0.44% | 0.17~0.37% | 0.5~0.8% | 0.8~1.0% | ≤0.030% | ≤0.035% | ≤0.035% | ≤0.030% |

A total of 24282 sets of production data of 120t converter in the plant were collected, and duplicate data, abnormal points and extreme abnormal points were deleted. The evaluation formula of abnormal data was:

$$\begin{cases} x_i > U + 1.5IQR \mid x_i < L + 1.5IQR & \text{Outlier} \\ IQR = U - L \\ x_i > U + 3IQR \mid x_i < L + 3IQR & \text{Extreme Outlier} \end{cases}$$

Where, $x_i$ represents the i-th data after the data to be measured is sorted from small to large, U represents the upper quartile, represents the lower quartile, and IQR represents the interquartile range.

After processing, 19,668 sets of valid data were obtained. In order to make different variables have the same measurement scale, the data is normalized and mapped to the range of [−1,1].

$$x'_{ij} = \frac{x_{ij} - mean(x_{ij})}{\max(x_{ij}) - \min(x_{ij})}$$

Where, $x_{ij}$ is the original data of the production data sample; $x'_{ij}$ is the normalized data; i represents the i-th sample point; j represents the j-th input variable; $\min(x_{ij})$, $\max(x_{ij})$ and $mean(x_{ij})$ are the minimum, maximum and average values in the original data samples.

According to the reaction mechanism of converter steelmaking and Pearson correlation analysis, the following process parameters that have a significant impact on the yield of Si, Mn and Cr elements are determined as the input variables of the model:

TABLE 2

Input variables and units of Si yield prediction model

| Input variables | Unit | Input variables | Unit |
|---|---|---|---|
| Puff loss | % | Alkalinity | — |
| Total oxygen consumption | m3 | Endpoint C content | % |
| Endpoint Mn content | % | Tapping temperature | ° C. |

TABLE 3

Input variables and units of Mn yield prediction model

| Input variables | Unit | Input variables | Unit |
|---|---|---|---|
| Puff loss | % | Alkalinity | — |
| Total oxygen consumption | m3 | Scrap ratio | % |
| Endpoint Mn content | % | | |

TABLE 4

Input variables and units of Cr yield prediction model

| Input variables | Unit | Input variables | Unit |
|---|---|---|---|
| Puff loss | % | Endpoint Mn content | % |
| Endpoint P content | % | Scrap ratio | % |

Figure 2:
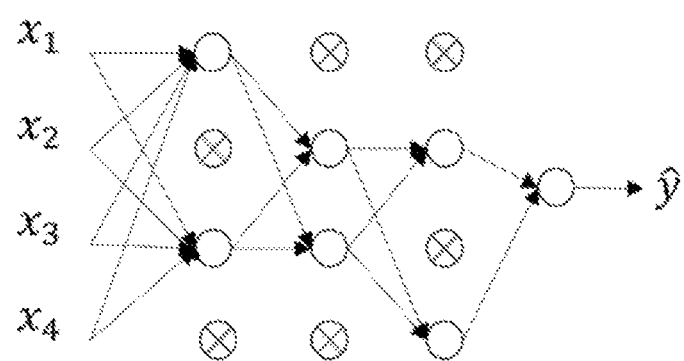
FIG. 2 is a schematic diagram of using dropout regularization to improve the generalization of the model.
Figure 3:
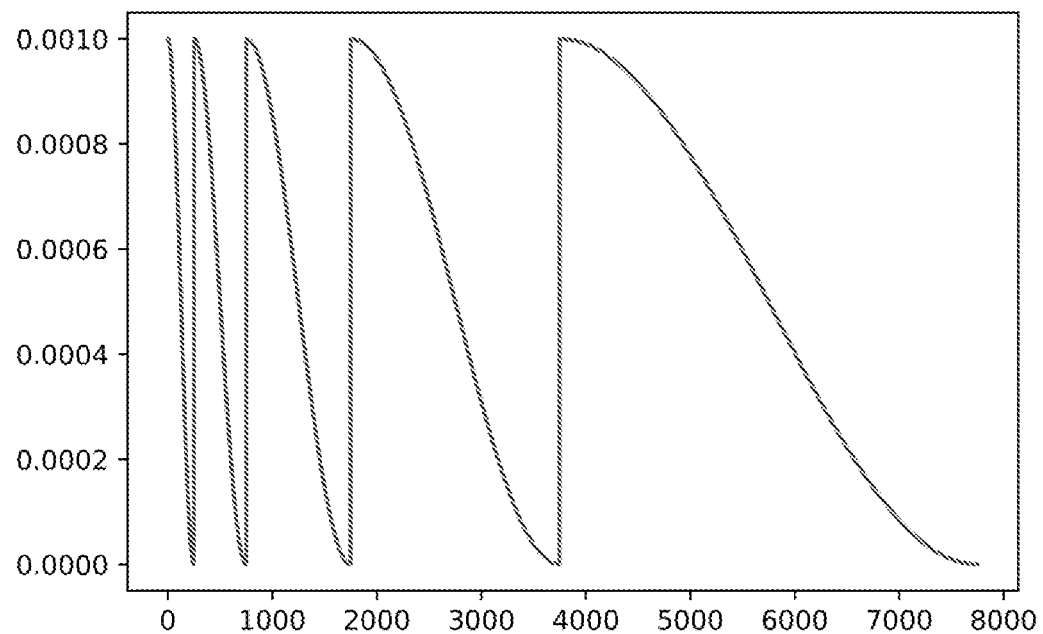
FIG. 3 shows the change trend of learning rate of prediction model training process with epochs.

Take the above parameters as the input variables of LSTM neural network, establish the prediction model of alloy yield in the process of converter tapping alloying, and use dropout regularization to improve the generalization of the model. The principle of dropout regularization is shown in FIG. 2, The training adopts warm-up restart random gradient descent method to dynamically adjust the learning rate. The change trend of learning rate with epochs during training is shown in FIG. 3, In LSTM neural network, forgetting gate, input gate and output gate use sigmoid function as activation function, when generating candidate memory, the hyperbolic tangent function tanh is used as the activation function.

The 24282 groups of data collected 18211 groups were used for model training, 6071 groups were used for testing the model to verify its generalization ability, and the parameters of the network were continuously adjusted to obtain the model with the best prediction effect.

In order to evaluate the accuracy of different model predictions, the root-mean-square error RMSE and correlation coefficient $R^2$ are selected as the performance evaluation indicators. RMSE and $R^2$ are the most widely used performance evaluation indicators. The calculation method is as follows:

$$RMSE = \sqrt{\frac{1}{N}\sum_{t=1}^{N}(y_t - \hat{y}_t)^2}$$

$$R^2 = 1 - \frac{MSE(\hat{y}_t, y_t)}{Var(y_t)}$$

Where, N represents the number of true values, $y_t$ represents the true value of t, $\hat{y}_t$ represents the predicted value of t, and $Var(y_t)$ represents the variance of $y_t$.

RMSE root-mean-square error measures the deviation between the observed value and the real value, and is often used as the standard for measuring the prediction results of machine learning models. $R^2$ is an important statistic reflecting the goodness of fit of the model. It is the ratio of the sum of regression squares to the sum of total squares. The value of $R^2$ is within the range of [0,1]. The size of the value reflects the degree of goodness of fit of the model. The closer $R^2$ is to 1, the more accurate the regression equation is. The prediction performance evaluation of three models is obtained:

TABLE 5

Prediction performance evaluation of Si
yield prediction model on test data set

| Evaluation criteria | Evaluation value |
|---|---|
| RMSE | 0.0339 |
| $R^2$ | 0.9557 |

TABLE 6

Prediction performance evaluation of Mn
yield prediction model on test data set

| Evaluation criteria | Evaluation value |
|---|---|
| RMSE | 0.0438 |
| $R^2$ | 0.9260 |

TABLE 7

Prediction performance evaluation of Cr
yield prediction model on test data set

| Evaluation criteria | Evaluation value |
|---|---|
| RMSE | 0.0379 |
| $R^2$ | 0.9444 |

From the evaluation results and the fitting performance of the model on the training data set, LSTM neural network can well fit the original data and has good prediction performance on the test set.

After the predicted value of yield is obtained, the addition amount of alloy is calculated on this basis, and the calculation method is as follows:

In this example 1, 7 kinds of alloy materials are selected to participate in the ingredient calculation. The alloy types and prices are shown in Table 8.

TABLE 8

Corresponding Table of Alloy Types and Prices

| | Type | | | | | | |
|---|---|---|---|---|---|---|---|
| | Silicon manganese | High carbon ferromanganese | Medium carbon ferromanganese | High carbon ferrochrome | Medium carbon ferrochrome | Low carbon ferrochrome | Ferrosilicon |
| Number | $x_1$ | $x_2$ | $x_3$ | $x_4$ | $x_5$ | $x_6$ | $x_7$ |
| Reference price (yuan/t) | 7200 | 6600 | 8800 | 8100 | 12700 | 18000 | 7700 |

The objective function is to minimize the total cost of alloy addition:

$$minZ = x_1 \cdot r_1 + x_2 \cdot r_2 + \ldots + x_7 \cdot r_7 =$$

$$7200x_1 + 6600x_2 + 8800x_3 + 8100x_4 + 12700x_5 + 18000x_6 + 7700x_7$$

At the same time, the following constraints must be met:

$$s.t. \begin{cases} \min(g_1) \le \dfrac{\sum_{j=1}^{n} x_j c_{1j} \eta_i}{P} + b_1 \le \max(g_1) \\ \vdots \\ \min(g_i) \le \dfrac{\sum_{j=1}^{n} x_j c_{ij} \eta_i}{P} + b_i \le \max(g_i) \\ \vdots \\ \min(g_m) \le \dfrac{\sum_{j=1}^{n} x_j c_{mj} \eta_i}{P} + b_m \le \max(g_m) \end{cases}$$

Where: P is the total weight of molten steel; $x_j$ is the addition amount of j-th alloy; $g_i$ is the content of element i; min represents the lower limit value; max represents the upper limit value; $b_i$ represents the content of elements i before alloying; $c_{ij}$ refers to the content of element i in alloy J; $\eta_i$ is the yield of element i.

The upper and lower limits of the components to be satisfied by the constraint conditions are shown in Table 9:

TABLE 9

Upper and lower limits of chemical composition content

| | C | Si | Mn | Cr | P | S |
|---|---|---|---|---|---|---|
| Lower limit | 0.37 | 0.17 | 0.5 | 0.8 | 0 | 0 |
| Upper limit | 0.44 | 0.37 | 0.8 | 1.0 | 0.035 | 0.035 |

The addition amount of alloy also needs to meet the following non-negative conditions:

$$\vec{X} = (X_1, X_2, \ldots, X_j, \ldots, X_n)^T, x_j \ge 0$$

The element recovery rates of Si, Mn and Cr are predicted by LSTM network model, and the recovery rates of C, P, S, B and Ti are calculated by 100%.

Table 10 randomly selects 8 groups to compare the calculation results of alloy addition of alloy steel 40Cr in the plant with the technical scheme of the invention and without the invention, wherein group 1 is the actual value of the original data, and group 2 is the result of alloy addition calculated according to the technical scheme of the invention.

After verification, the element qualification rate of the method for determining the amount of alloy added in the converter tapping process of the invention is 100%, which can accurately guide the actual production. The average alloy cost per heat is reduced from 23055 yuan to 20867 yuan, which is 2188 yuan. The steel plant produces more than 35 molten steel per converter per day on average. Using the method to determine the alloy addition amount in the converter tapping process of the invention can save more than 10 million yuan per year in the alloy steel production cost, which has good economic benefits and can provide reference for on-site production.

results to obtain the alloy addition amount through integer linear programming. This method can not only quickly find the optimal scheme of alloy proportioning, but also improve the component hit rate and the stability of steel products in the converter steelmaking process, and obtain the lowest

| | | | | Calculation and Comparison of 40Cr Alloy Addition Amount of Alloy Steel | | | | | |
|---|---|---|---|---|---|---|---|---|---|
| Number | Group | Silicon manganese | High carbon ferromanganese | Medium carbon ferromanganese | High carbon ferrochrome | Medium carbon ferrochrome | Low carbon ferrochrome | Ferrosilicon | Cost |
| 1 | 1 |  | 1009 |  | 2000 |  |  | 122 | 23799 |
|   | 2 | 382 | 556 |  | 1829 |  |  |  | 21235 |
| 2 | 1 |  | 995 |  | 1950 |  |  | 113 | 23232 |
|   | 2 | 294 | 691 |  | 1755 |  |  |  | 20893 |
| 3 | 1 |  | 995 |  | 1949 |  |  | 116 | 23247 |
|   | 2 | 403 | 558 |  | 1751 |  |  |  | 20768 |
| 4 | 1 |  | 1002 |  | 1853 |  |  | 116 | 22516 |
|   | 2 | 403 | 545 |  | 1740 |  |  |  | 20593 |
| 5 | 1 |  | 1005 |  | 1858 |  |  | 120 | 22607 |
|   | 2 | 398 | 554 |  | 1755 |  |  |  | 20738 |
| 6 | 1 |  |  | 1080 |  | 751 | 1080 | 147 | 39614 |
|   | 2 | 403 | 551 |  | 1751 |  |  |  | 20721 |
| 7 | 1 | 580 |  | 146 | 1006 | 734 |  |  | 22931 |
|   | 2 | 398 | 547 |  | 1755 |  |  |  | 20691 |
| 8 | 1 |  |  | 1352 |  | 2150 |  | 150 | 40358 |
|   | 2 | 395 | 559 |  | 1823 |  |  |  | 21300 |

In the above embodiments, it can be implemented in whole or in part by software, hardware, firmware or any combination thereof. When the use is implemented in whole or in part in the form of a computer program product, the computer program product includes one or more computer instructions. When the computer program instructions are loaded or executed on the computer, the processes or functions described in accordance with the embodiments of the invention are generated in whole or in part. The computer can be a general-purpose computer, a special-purpose computer, a computer network, or other programmable devices. The computer instructions can be stored in a computer-readable storage medium, or transmitted from one computer-readable storage medium to another computer-readable storage medium. For example, the computer instructions can be transmitted from one website site, computer, server or data center to another website site through wired (such as coaxial cable, optical fiber, digital subscriber line (DSL) or wireless (such as infrared, wireless, microwave, etc.) Computer, server or data center). The computer-readable storage medium can be any available medium that can be accessed by the computer or a data storage device such as a server, a data center, etc. that contains one or more available media. The available media can be magnetic media (such as floppy disk, hard disk, magnetic tape), optical media (such as DVD), or semiconductor media (such as solid state hard disk (SSD)), etc.

The invention combines LSTM neural network with integer linear programming algorithm to overcome the limitations of the conventional neural network model to predict the time series, and overcome the problems of low accuracy of artificial estimation and poor economic benefits of the alloy proportioning scheme. Considering that LSTM neural network has a strong ability to capture nonlinear relationships, the invention constructs a prediction model of alloy element yield based on LSTM neural network. Different alloy elements have different factors that affect their yield, that is, different input variables of the model, so different alloy elements establish different LSTM models for training. In addition, the invention combines the yield prediction results to obtain the alloy addition amount through integer linear programming. This method can not only quickly find the optimal scheme of alloy proportioning, but also improve the component hit rate and the stability of steel products in the converter steelmaking process, and obtain the lowest total cost, effectively reduce the alloying cost, and has a good application prospect. The method is tested by the actual production data on site, and the results show that the invention has good accuracy and economic benefits, and can provide useful guidance for the addition of alloy in the field production process.

The above is only the preferred embodiment of the invention and does not limit the patent scope of the invention. Under the invention concept of the invention, the equivalent structure transformation made by using the description of the invention and the attached drawings, or the direct/indirect application in other relevant technical fields, are included in the patent protection scope of the invention.

What is claimed is:
1. A method for determining an amount of alloy added during converter tapping, comprising following steps:
　S1, collecting a converter production data set and establish a prediction model database;
　S2, conducting data screening and elutriation on the collected converter production data set, and pre-process the data after screening and elutriation;
　S3, determining process parameter variables that affect a Si yield in a converter tapping process as input variables for establishing a LSTM (Long Short-Term Memory) neural network Si yield prediction model;
　S4, determining process parameter variables that affect a Mn yield in the converter tapping process as input variables for establishing a LSTM neural network Mn yield prediction model;
　S5, determining process parameter variables that affect a Cr yield in the converter tapping process as input variables for establishing a LSTM neural network Cr yield prediction model;
　S6, training and testing the LSTM neural network Si yield prediction model, the LSTM neural network Mn yield prediction model, and the LSTM neural network Cr yield prediction model;
　S7, collecting real-time data of on-site smelting process, and providing the real-time data of on-site smelting process to the LSTM neural network Si yield prediction model, the LSTM neural network Mn yield prediction model, and the LSTM neural network Cr yield prediction model to predict a recovery rate of Si, Mn and Cr elements;

S8, determining an alloy addition amount through integer linear programming,. specifically including:

minimizing a total cost Z of alloy addition as an objective function $$\min Z=\sum_{i=1}^{n} x_i \cdot r_i = x_1 \cdot r_1 + x_2 \cdot r_2 + \ldots + x_n \cdot r_n \quad (4)$$

where: $r_i$ represents an unit price of the i-th alloy material; $x_i$ is the amount of the i-th alloy added; and S9, adding alloy according to the determined alloy addition amount.

2. The method according to claim 1, wherein in step Si, the converter production data set comprises:

production date, furnace number, blowing cycle, molten iron composition, molten iron charge, scrap charge, slag charge, alloy charge, sublance information, endpoint chemical composition, oxygen blowing information, tapping temperature, tapping quantity and composition of ladle sample after alloying.

3. The method according to claim 1, wherein in step S2, the collected converter production data set is screened and washed, specifically including:

deleting duplicate data, delete outliers and extreme outliers; an evaluation of outliers is as follows:

$$\begin{cases} x_i > U + 1.5 IQR \mid x_i < L + 1.5 IQR & \text{Outlier} \\ IQR = U - L \\ x_i > U + 3 IQR \mid x_i < L + 3 IQR & \text{Extreme Outlier} \end{cases} \quad (1)$$

where, $x_i$ represents the i-th data after the data to be measured is sorted from small to large, U represents the upper quartile, represents the lower quartile, and IQR represents the interquartile range.

4. The method according to claim 1, wherein in step S2, the data after screening and elutriation are pretreated, specifically including:

normalizing the dataset to [−1,1], and the specific processing method is shown in formula (2):

$$x'_{ij} = \frac{x_{ij} - \text{mean}(x_{ij})}{\max(x_{ij}) - \min(x_{ij})} \quad (2)$$

where, $x_{ij}$ is an original data of a production data sample; $x'_{ij}$ is a normalized data; i represents the i-th sample point; j represents the j-th input variable; $\min(x_{ij})$, $\max(x_{ij})$ and $\text{mean}(x_{ij})$ are the minimum, maximum and average values in the original data samples.

5. The method according to claim 1, wherein in step S3, the input variables of the LSTM neural network Si yield prediction model for the Si recovery rate include: ladle state, blowing loss, alkalinity, total oxygen content, end point C, end point Mn, tapping temperature;

in step S4, the input variables of the LSTM neural network Mn yield prediction model include: blow loss, alkalinity, scrap ratio, total oxygen content, and end point Mn;

in step S5, the input variables of the LSTM neural network Cr yield prediction model include blow loss, scrap ratio, end point Mn, and end point P.

6. The method according to claim 1, wherein in the step S6, a warm-up restart random gradient descent method is applied in training the training and testing the LSTM neural network Si yield prediction model, the LSTM neural network Mn yield prediction model, and the LSTM neural network Cr yield prediction model to dynamically adjust a learning rate:

the learning rate adjustment is shown in equation (3):

$$\eta_t = \eta_{min}^i + \frac{1}{2}(\eta_{max}^i - \eta_{min}^i)\left(1 + \cos\left(\frac{T_{cur}}{T_i}\pi\right)\right) \quad (3)$$

where, $\eta_{min}^i$ and $\eta_{max}^i$ are the range of learning rate; $T_{cur}$ represents the number of epoch changes from the beginning to the end of each restart; $T_i$ represents the restart cycle.

7. The method according to claim 1, wherein in step S8, the amount of alloy added is solved by integer linear programming, specifically including:

$$\min Z = \sum_{i=1}^{n} x_i \cdot r_i = x_1 \cdot r_1 + x_2 \cdot r_2 + \ldots + x_n \cdot r_n \quad (4)$$

where: $r_i$ represents the unit price of the i-th alloy material; $x_i$ is the amount of the i-th alloy added;

at the same time, the following constraints must be met:

$$s.t.\begin{cases} \min(g_1) \le \dfrac{\sum_{j=1}^{n} x_j c_{1j}\eta_i}{P} + b_1 \le \max(g_1) \\ \quad\vdots \\ \min(g_i) \le \dfrac{\sum_{j=1}^{n} x_j c_{ij}\eta_i}{P} + b_i \le \max(g_i) \\ \quad\vdots \\ \min(g_m) \le \dfrac{\sum_{j=1}^{n} x_j c_{mj}\eta_i}{P} + b_m \le \max(g_m) \end{cases} \quad (5)$$

where: P is the total weight of molten steel; $x_j$ is the addition amount of j-th alloy; $g_i$ is the content of element i; min represents the lower limit value; max represents the upper limit value; $b_i$ represents the content of elements i before alloying; $c_{ij}$ refers to the content of element i in alloy j; $\eta_i$ is the yield of element i;

the alloy addition must meet the following non-negative conditions:

$$\vec{X}=(X_1,X_2,\ldots,X_j,\ldots,X_n)^T, x_j \ge 0 \quad (6)$$

the maximum value of alloy addition less than the amount of alloy that can be added is:

$$x_j \le L_j \quad (7)$$

where: $L_j$ represents the maximum amount of alloy j added in actual production;

as the preferred scheme of the method for determining the alloy addition amount in the converter tapping process described in the present invention, the element recovery rate is calculated by 100%, except for Si, Mn and Cr elements predicted according to step S7.

8. A determination system of alloy addition in the converter tapping process, which implements the method of claim 1.

9. An information data processing terminal for realizing the method of claim 1.

* * * * *